(12) United States Patent
Manikas et al.

(10) Patent No.: US 10,190,577 B1
(45) Date of Patent: Jan. 29, 2019

(54) HOISTABLE INDUCTION AND COOLING UNIT FOR WIND TURBINE MAINTENANCE

(71) Applicant: General Electric Company, Schenectady, NY (US)

(72) Inventors: Brian William Manikas, Schenectady, NY (US); Darrick Adam Vanderwalker, Pattersonville, NY (US); Gregory Clarence Thomas, Saratoga Springs, NY (US); Kevin Tyler Eherts, Albany, NY (US); Hunter Ryan Anderson, Muskegon, MI (US); Michael Royce Johnson, Campton, NH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/692,532

(22) Filed: Aug. 31, 2017

(51) Int. Cl.
| | |
|---|---|
| *F03D 80/50* | (2016.01) |
| *F03D 13/40* | (2016.01) |
| *B66C 1/10* | (2006.01) |

(52) U.S. Cl.
CPC .............. *F03D 80/50* (2016.05); *B66C 1/108* (2013.01); *F03D 13/40* (2016.05); *F05B 2230/80* (2013.01)

(58) Field of Classification Search
CPC ......... F03D 80/50; F03D 13/40; B66C 1/108; F05B 2230/80
See application file for complete search history.

(56) References Cited

U.S. PATENT DOCUMENTS

| | | |
|---|---|---|
| 6,559,428 B2 | 5/2003 | Panczner |
| 2009/0223163 A1 | 9/2009 | Quek et al. |
| 2012/0060685 A1* | 3/2012 | Salter .................... F04B 1/0538 92/128 |

FOREIGN PATENT DOCUMENTS

CN 105221358 A 1/2016

* cited by examiner

*Primary Examiner* — Sean Gugger
(74) *Attorney, Agent, or Firm* — Dority & Manning, P.A.

(57) ABSTRACT

A maintenance tool and method for detaching mechanically-connected components of a drive train in a wind turbine is disclosed. The method involves positioning the maintenance tool below a hoist and hoisting only the lift assembly portion of the maintenance tool into a nacelle of a wind turbine. Connecting the lift assembly portion to a power source in the nacelle and extending at least two induction cables from an induction generator disposed on the lift assembly portion to wrap at least a portion of a component of the mechanically-connected components. Then operating the induction generator to pass alternating current through the induction cables and inductively heat the wrapped component such that thermal expansion creates a clearance between the mechanically-connected components thereby assisting in separating the mechanically-connected components.

20 Claims, 7 Drawing Sheets

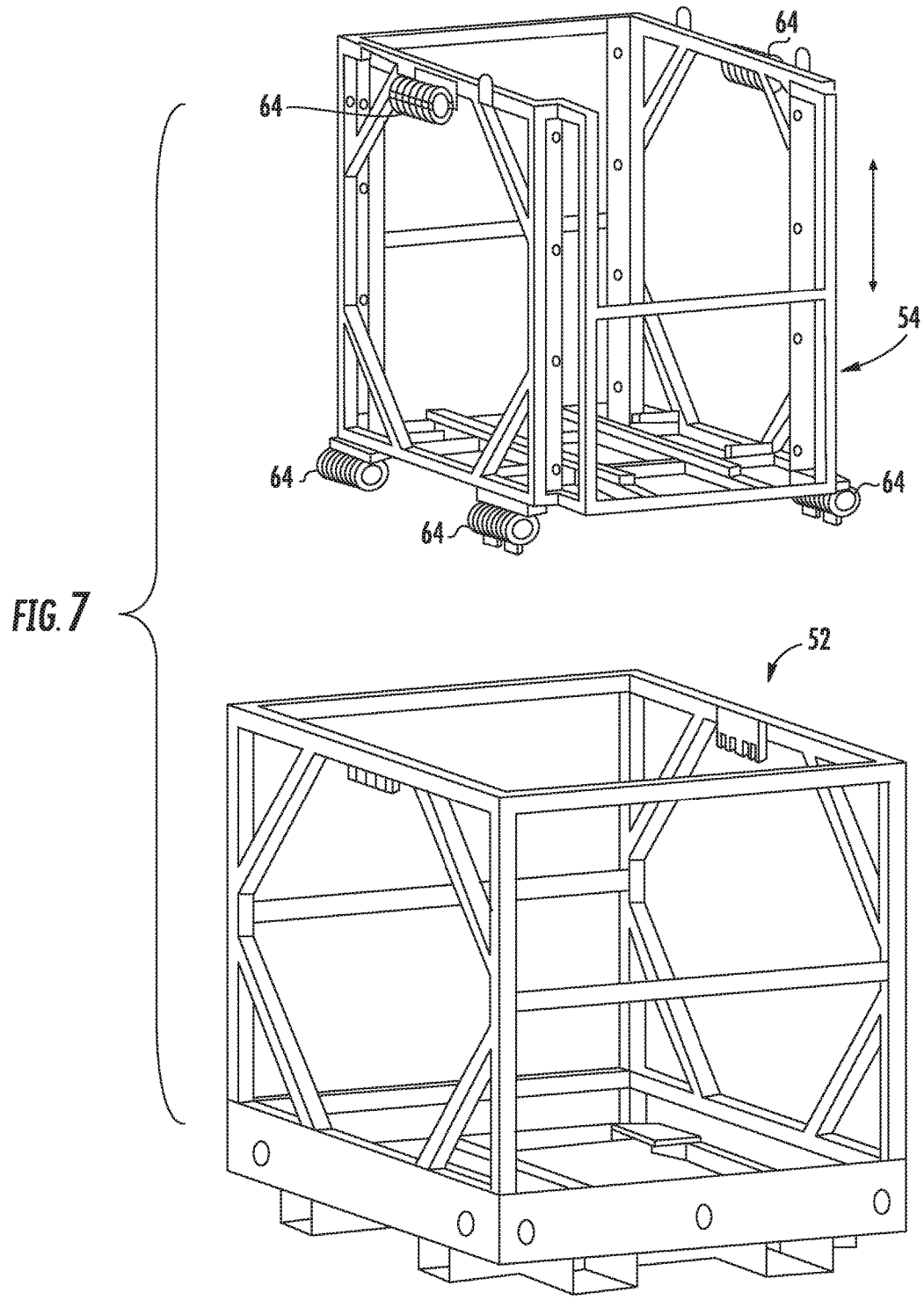

HOISTABLE INDUCTION AND COOLING UNIT FOR WIND TURBINE MAINTENANCE

FIELD OF THE INVENTION

The present subject matter relates generally to wind turbines and, more particularly, to methods and devices for assisting in separating mechanically-connected components.

BACKGROUND OF THE INVENTION

Modern wind turbines are used to supply electricity into the electrical grid. Wind turbines generally comprise a tower and a rotor arranged on the tower. The rotor, which typically comprises a hub and a plurality of blades, is set into rotation under the influence of the wind on the blades. Said rotation generates a torque that is normally transmitted through a rotor shaft to a generator, either directly or through the use of a gearbox. This way, the generator produces electricity which can be supplied to the electrical grid.

Gearboxes, bearings and other components of the wind turbine drive train are mechanical devices that experience wear. Even with the drive train mounted in a housing or nacelle and thus protected from direct exposure to the elements, components such as gearboxes and bearings can indirectly experience stress from extreme environmental conditions because of their coupling to large rotors. Thus, gearboxes and other components of the drive train in wind turbines require occasional repair and/or replacement. These drive trains use many mechanically connected components that may require separation to perform the repair and/or replacement.

In at least one known method for replacing a gearbox in a wind turbine, a crane is required to lift the gearbox out of an open nacelle. In a typical wind turbine, a large rotor is fastened to the other end of the main shaft. This rotor has several blades attached to a hub, so to prevent the main shaft from bending or the rotor from becoming tilted. The blade/hub assembly has to be removed from the turbine before the gearbox can be removed. The size of the wind turbines makes servicing difficult and expensive, as at the 65 meters or greater height of some wind turbines used in generator farms, a large crane is required. Two cranes are required in some cases, because the entire rotor set must be removed in some cases and brought to the ground. A second crane is used to grab the bottom blade of the rotor and to "tail it out," i.e., make it flat in the air so that it can be set on the ground. Thus, any repair methods that can be performed up-tower can avoid much of the effort described above.

At least one known method of removing mechanically-connected parts in the wind turbine drive train is to use large amounts of axial force in order to pry the components apart. Using these large axial forces to separate parts carries a large risk of damaging the parts which would in turn mean that replacement parts would need to be provided. Also, lowering the entire assembly to the ground via crane is both overly time-consuming and expensive.

Thus, a need exists for a maintenance tool that can be easily transported to the wind turbine site, can be hoisted up-tower, and can assist in separating mechanically-connected components without damaging the components.

BRIEF DESCRIPTION OF THE INVENTION

Aspects and advantages of the invention will be set forth in part in the following description, or may be obvious from the description, or may be learned through practice of the invention.

In one aspect, a method for detaching mechanically-connected components of a drive train in a wind turbine is disclosed having the steps of; positioning a maintenance tool below a hoist, the maintenance tool having a nested configuration of a transport frame portion, an isolation assembly portion, and a lift assembly portion; hoisting only the lift assembly portion of the maintenance tool into a nacelle of a wind turbine; connecting the lift assembly portion to a power source in the nacelle; extending at least two induction cables from an induction generator disposed on the lift assembly portion, and wrapping the at least two induction cables proximate at least a portion of a component of the mechanically-connected components; operating the induction generator to pass alternating current through the at least two induction cables and inductively heat the wrapped component such that thermal expansion creates a clearance between the mechanically-connected components; and separating the mechanically-connected components.

In another aspect, a maintenance tool for detaching mechanically-connected components in a wind turbine is disclosed as having; a transport frame portion; an isolation assembly portion at least partially removably encased within the transport frame portion; and a lift assembly portion at least partially removably encased within the isolation assembly portion. The lift assembly portion can have an induction generator with at least two induction cables configured to wrap around at least one component of mechanically-connected components. The at least two induction cables inductively couple with the at least one component so as to raise the temperature of the at least one component such that a clearance is created between the mechanically-connected components to separate the mechanical connection. A chiller is configured for cooling the induction generator.

In another aspect, a wind turbine is disclosed as having a tower, a nacelle mounted atop the tower, a drive train positioned in the nacelle, the drive train having a main rotor shaft extending between a hub and an electric generator, and, a maintenance tool as described above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 illustrates an embodiment of the transport frame portion and isolation assembly portion of a maintenance tool.

Figure 1:
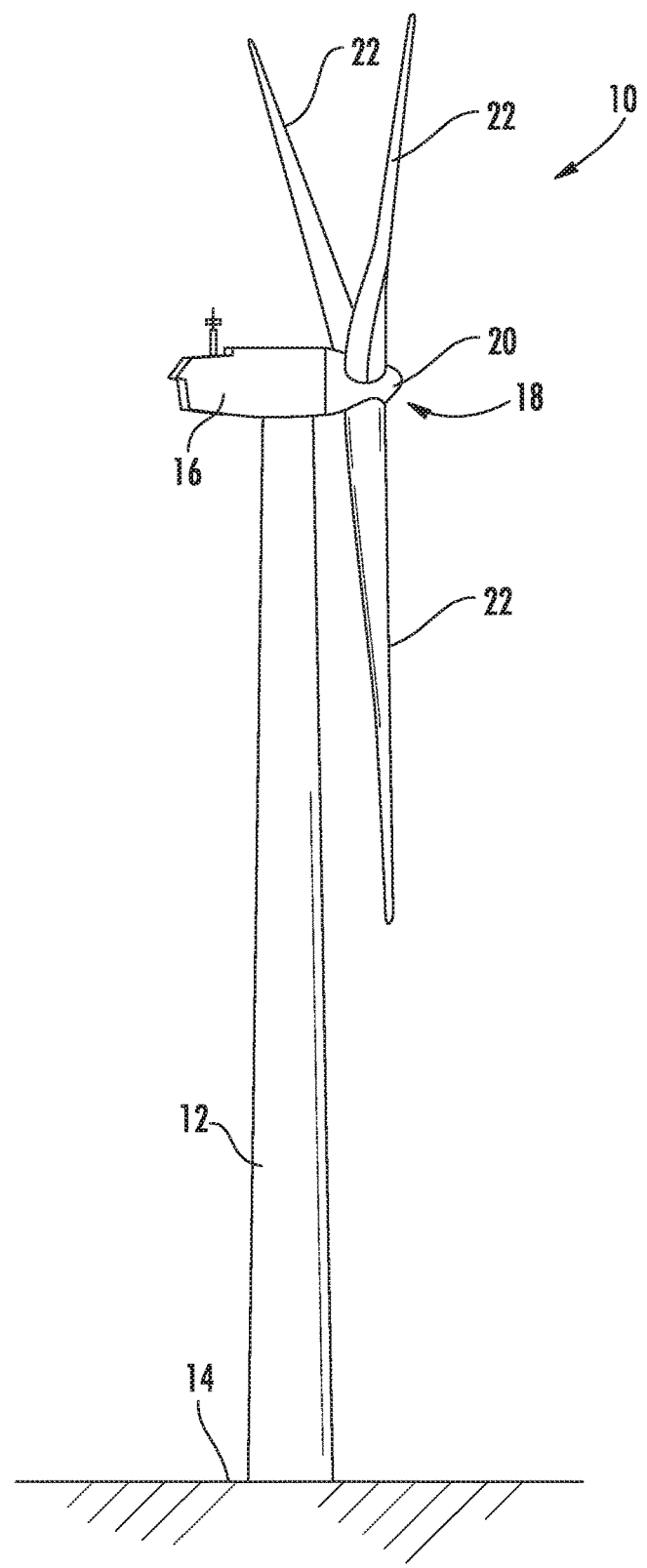
FIG. 1 illustrates a perspective view of one embodiment of an onshore wind turbine of conventional construction.

Repeat use of reference characters in the present specification and drawings is intended to represent the same or analogous features or elements of the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is a maintenance tool, and associated system and method, that provides inductive heat to portions of mechanically-connected components that require separation to perform maintenance or repair. Certain components of the wind turbine utilize mechanical connections, such as interference fits, to attach components together, for example the main bearing and rotor shaft. The interference fit must be overcome to separate these parts and perform repairs or install replacements. A maintenance tool, sometimes referred to herein as a hoistable induction and cooling unit (HICU), assists in separating an interference fit by providing inductive heat to the outer part of a component, thereby causing thermal expansion and opening a clearance between the components to separate the interference fitted components with minimal axial force, thus minimizing and/or eliminating entirely damage to the components being separated. The HICU inductively heats the outer component and can be used both on the ground and up-tower in the nacelle. The HICU can be used up-tower and can save multiple days during a repair by avoiding hoisting and lifting entire parts and assemblies of a drive train to the ground via crane. The HICU provides the necessary amount of inductive heat to assist in separating parts, is easily transported, is operable by a team of two personnel, and can also be hoisted by a hoist positioned inside the wind turbine nacelle.

The HICU can be safely transported by freight by nesting in a dampening system portion of the isolation assembly portion which protects the components of the lift assembly portion from damage during transit. The lift assembly portion is designed with lifting points to allow a crane to hoist the unit up into the nacelle, and is easily detachable from the transport and isolation assembly portions. Once hoisted up-tower, the HICU is placed on provided platforms and the fiberglass-coated induction wraps are connected to the induction generator. The HICU provides heat by passing alternating electrical current through the induction wraps, which are wrapped around at least a portion of the component to be heated. The electrical field from the induction cables inductively couples with the component and electromagnetically induces heat into the component using electrical eddy currents. The HICU can connect to the wind turbine top box through a 3-phase-grounded power connector extending from the HICU. Setting the HICU controls at about 0 volts to about 690 volts AC and a current of about 0 amps to about 80 amps, the HICU can heat wrapped components up to 600 degrees Fahrenheit. Once heated, the parts once held together by the interference fit can be easily detached.

The HICU also contains a chiller within the lift assembly portion. The chiller can use water and anti-freeze to reject the operational heat loss from the induction generator inefficiencies, and can continually run while induction heat is being generated. The chiller assembly protects the HICU from overheating while the induction wraps increase the temperature of the wrapped components.

Referring now to the drawings, FIG. 1 illustrates a perspective view of one embodiment of a wind turbine 10 of conventional construction. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 could include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
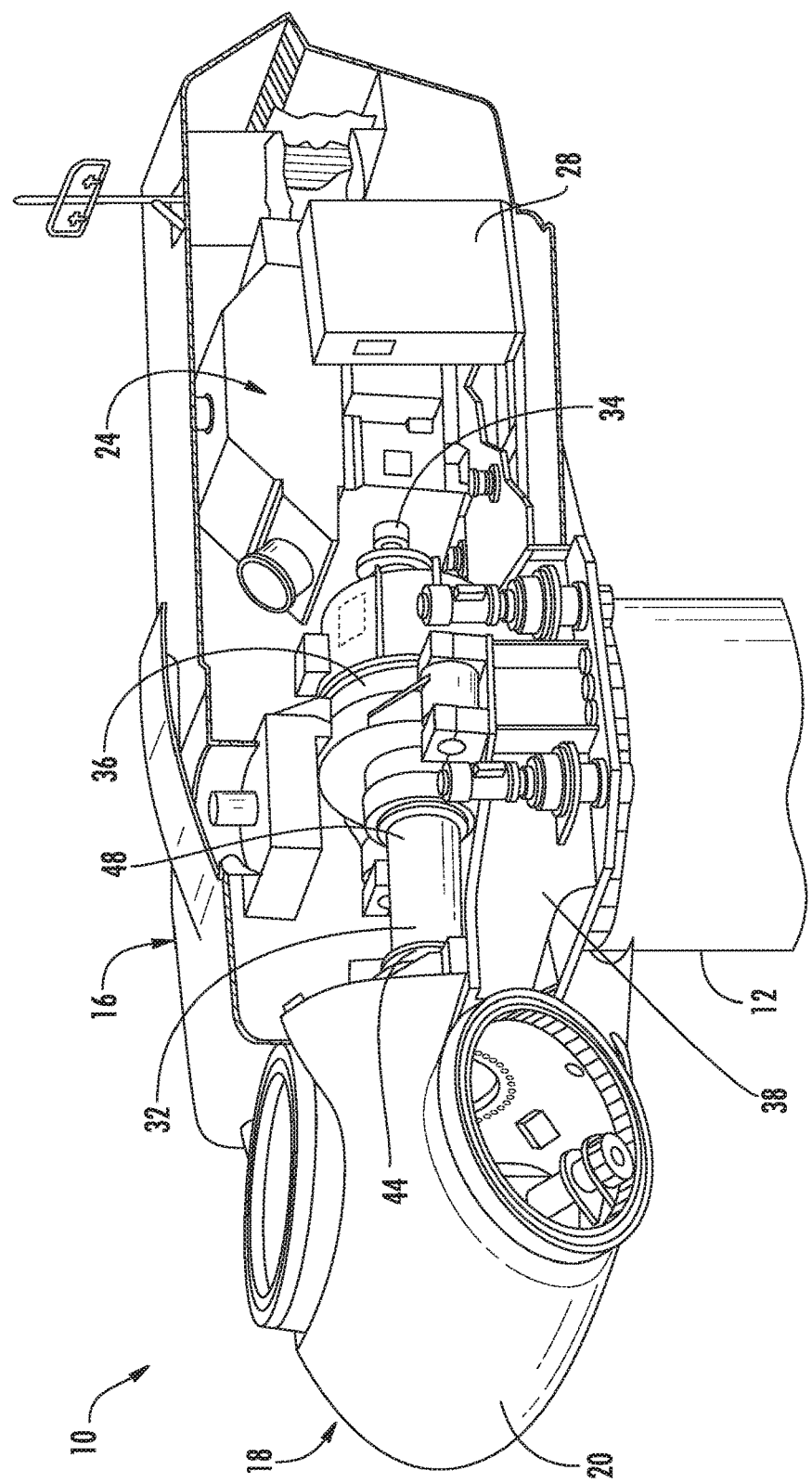
FIG. 2 illustrates an internal perspective of a nacelle having a gear-driven drive train and rotatable hub.

Referring now to FIG. 2, a simplified, internal view of one embodiment of a nacelle 16 of a wind turbine 10 is illustrated. As shown, a generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 32 coupled to the hub 20 for rotation therewith. A shaft carrier 48 can at least partially enclose the rotor shaft 32 for protection of the rotor shaft 32. The rotor shaft 32 may, in turn, be rotatably coupled to a generator shaft 34, sometimes referred to as the high speed shaft (HSS), of the generator 24 through a gearbox 36 having a gearbox output shaft 35. As is generally understood, the rotor shaft 32 may provide a low speed, high torque input to the gearbox 36 in response to rotation of the rotor blades 22 and the hub 20. The gearbox 36 may then be configured to convert the low speed, high torque input to a high speed, low torque output to drive the generator shaft 34 (HSS), and thus, the generator 24.

Forward support bearing 44 and aft support bearing 46 facilitate radial support and alignment of rotor shaft 32. Forward support bearing 44 is coupled to rotor shaft 32 near rotatable hub 20. Aft support bearing 46 is positioned on rotor shaft 32 nearer gearbox 36 and/or generator 24. A shaft carrier 48 extends from the rotor locking disk 30 to the gearbox 36 and encloses all shaft bearings and the rotor shaft 32. Alternatively, nacelle 16 includes any number of support bearings that enable wind turbine 10 to function as disclosed herein.

Figure 3:
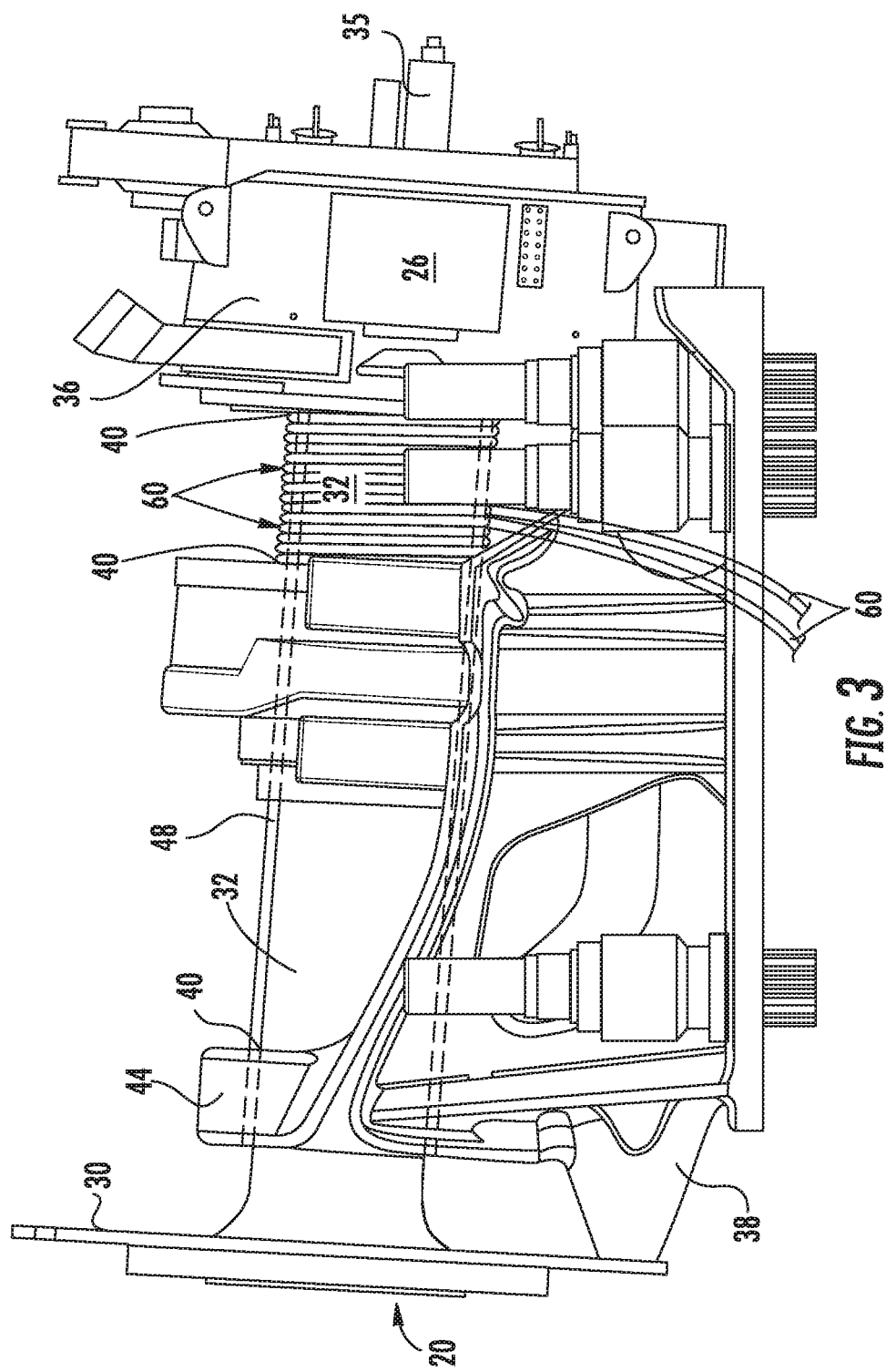
FIG. 3 illustrates an internal side view of a portion of one embodiment of the nacelle.

FIG. 3 is an internal side view of a portion of the nacelle 16 in accordance with an embodiment of the present invention. The bedplate assembly 38 includes the rotor shaft 32 with a first end coupled to the rotatable hub 20 of the wind turbine 10 (as shown in FIG. 1). The rotor shaft 32 also includes an opposite end coupled to the gearbox 36. Typical mechanically-connected components 40 include the rotor shaft 32 to the main bearing in the gearbox 36, rotor shaft 32 to the aft support bearing 46, rotor shaft 32 to the forward support bearing 44, all of which are generally an interference fit mechanical connection. Interference fit is sometimes referred to as a press fit or friction fit because fastening the two components is achieved by friction at the intersection of the two components after the components are pushed together, rather than by any other means of fastening. An interference fit can also be used at other mechanical connections including a flexible coupling (not shown). To assist in separating the mechanically-connected components 40 where the main rotor shaft 32 is press fit into the gearbox 36, induction cables 60 are shown wrapped around at least a portion of a shaft carrier 48 where they inductively couple with the rotor shaft 32 and raise the temperature of the rotor shaft 32 to create a clearance at the intersection of the mechanically-connected components 40 and enable easier separation of the components 40 by applying axial separation forces at the mechanical connection. The induction cables 60 can be wrapped adjacent each other in the same direction around at least a portion of the shaft carrier 48 to maximize the induction potential from the cables.

Figure 4:
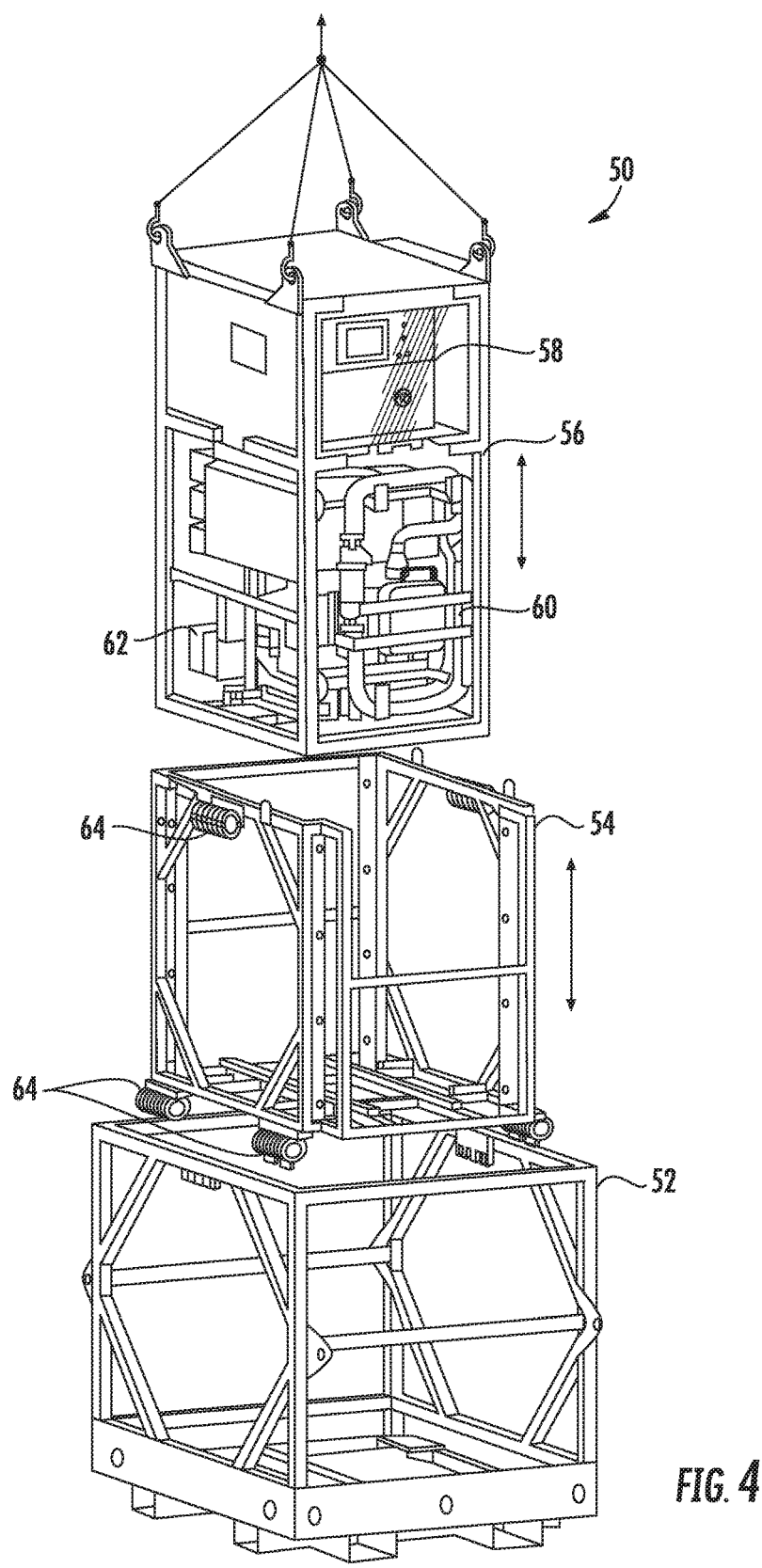
FIG. 4 illustrates an exploded view of an embodiment of a maintenance tool.

FIG. 4 illustrates one embodiment of a maintenance tool 50 for detaching mechanically-connected components 40 in a wind turbine 10. The maintenance tool 50 can have a transport frame portion 52, an isolation assembly portion 54 that can be at least partially removably encased within the transport frame portion 52, and a lift assembly portion 56 that can be at least partially removably encased within the isolation assembly portion 54. The lift assembly portion 56 can have an induction generator 58 that itself can have at least two induction cables 60 configured to wrap around at least one component of mechanically-connected components 40 of the wind turbine 10 drive train. The at least two induction cables 60 can inductively couple with at least one component of the mechanically-connected components 40 so as to raise the temperature of the at least one component and create a clearance at the intersection of the mechanically-connected components 40 and enable easier separation of the components 40 by applying axial separation forces at the mechanical connection. The at least two induction cables 60 can have a fiberglass coating and can be wrapped adjacent each other in opposing directions around the component to be heated.

The lift assembly portion 56 can also have a chiller 62 configured for cooling the induction generator 58. The chiller 62 operates to maintain the temperature of the induction generator 58 below a setpoint and can reject the heat from the induction generator 58 into at least one of water, ethylene glycol, air, and/or combinations thereof.

The isolation assembly portion 54 can have at least one load isolator 64 attached to the isolation assembly portion 54. The at least one load isolator 64 can be disposed between the isolation assembly portion 54 and the transport frame portion 52 to provide vibration isolation of the lift assembly portion 56 during transit. The at least one load isolator 64 can be constructed from helical wire cables, S-shaped cables, short bars, springs, and/or combinations thereof.

The induction generator 58 can be powered from a power source in a top box 28 (see FIG. 2) in the nacelle 16 of the wind turbine 10 and can operate in the range of about 0 volts AC to about 690 volts AC and a current of about 0 amps to about 100 amps. Within these induction generator 58 operating parameters, the heated component of mechanically-connected components 40 can increase temperature to a range of about 100 degrees Fahrenheit to about 600 degrees Fahrenheit.

Induction heating from the induction cables 60 can be applied to any mechanical connection made from materials that will inductively couple with the current from the induction generator 58, including metals, metallic alloys, some composites, and some non-metals. The mechanically-connected components 40 can be a main rotor shaft 32, a bearing, a flexible coupling, a flange and/or combinations thereof. The mechanical connection can be an interference fit connection, a bolted connection, a screwed connection, and/or combinations thereof. Thus, the maintenance tool can essentially be used in any mechanical connection detachment that can accommodate the induction cables 60 and will benefit from being heated for detachment assistance.

Figure 5:
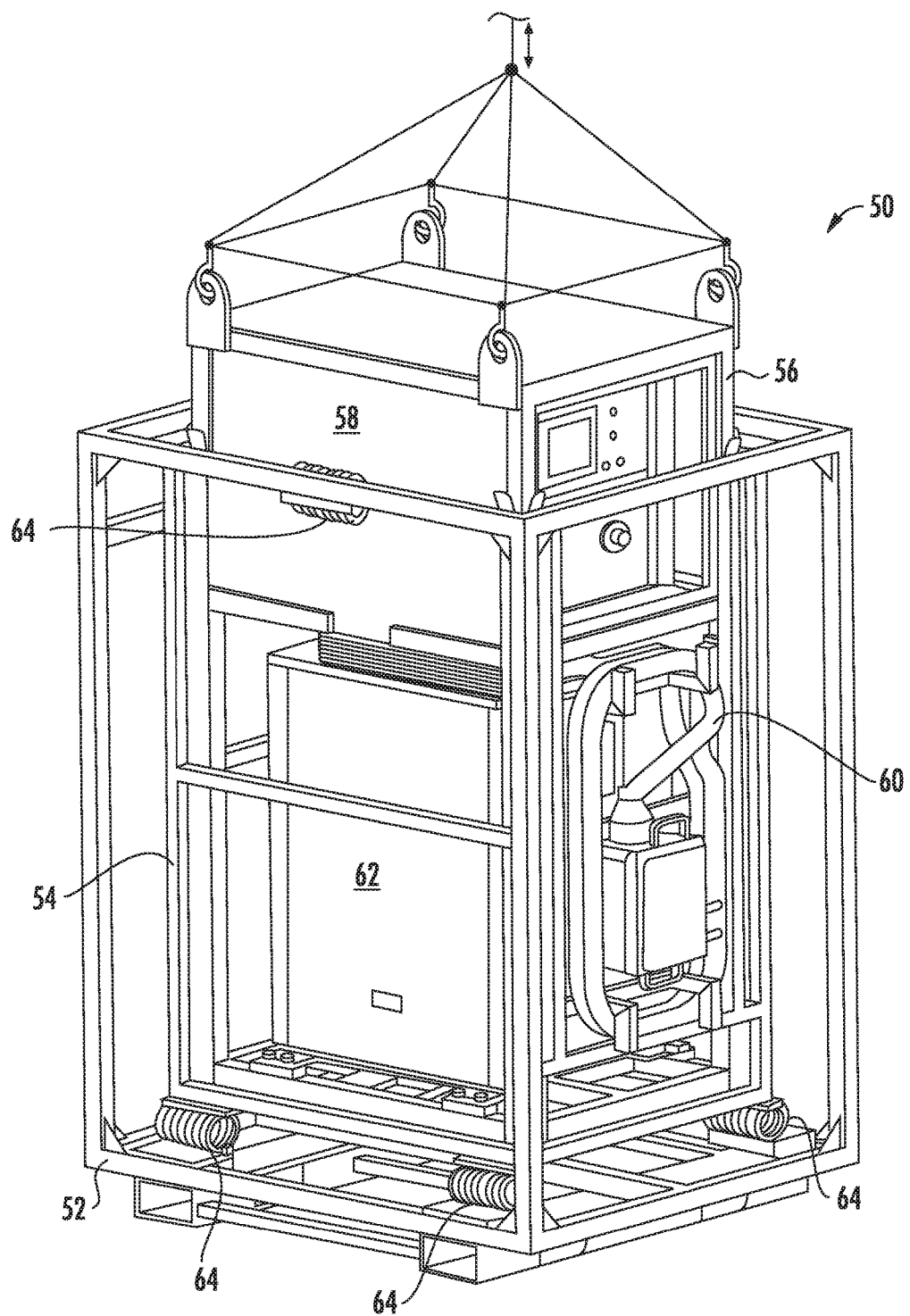
FIG. 5 illustrates an assembled view of an embodiment of a maintenance tool.

FIG. 5 illustrates an assembled view of an embodiment of a maintenance tool 50 as it is transported, having a transport frame portion 52, an isolation assembly portion 54 that can be at least partially removably encased within the transport frame portion 52, and a lift assembly portion 56 that can be at least partially removably encased within the isolation assembly portion 54. The lift assembly portion 56 shows an induction generator 58 having at least two induction cables 60 configured to wrap around at least one component of mechanically-connected components 40 of the wind turbine 10 drive train.

Figure 6:
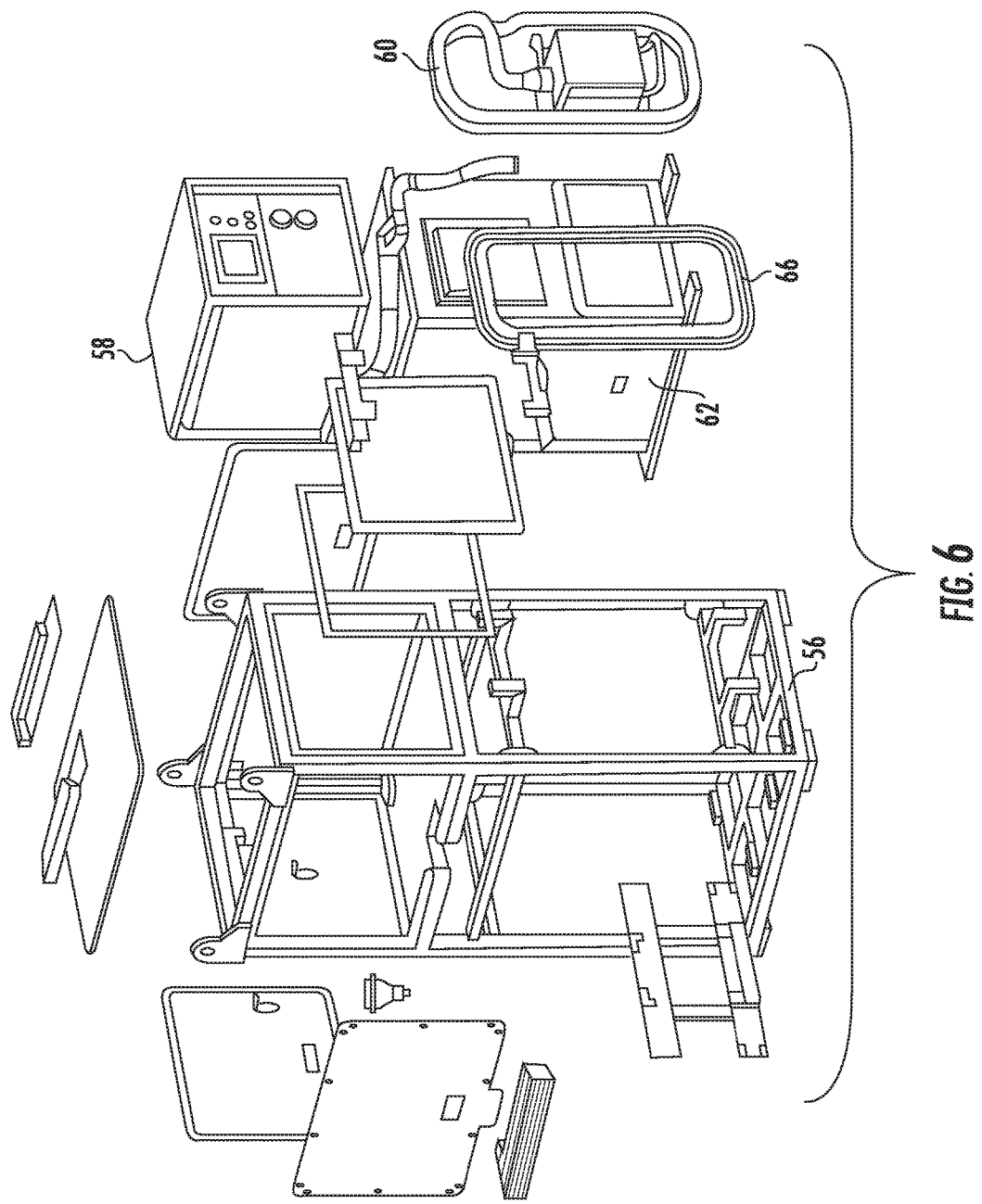
FIG. 6 illustrates an exploded view of components of a lift assembly portion of a maintenance tool.

FIG. 6 illustrates an exploded view of components of a lift assembly portion 56 of a maintenance tool 50. An induction generator 58 and chiller 62 are shown to be stacked inside the lift assembly portion 56. The induction generator 58 has a power chord 66 that can be connected to the top box 28 in the nacelle 16. Induction cables 60 extend from the induction generator 58 to mechanically-connected components 40 to heat one of the components which assists in separation of the mechanically-connected components 40.

FIG. 7 illustrates an embodiment of the transport frame portion 52 and isolation assembly portion 54 of a maintenance tool 50. The isolation assembly portion 54 shows load isolators 64 attached to various points so that when it is loaded into the transport frame portion 52, the load isolators 64 served to isolate any transport vibrations from the lift assembly portion 56 that nests inside the isolation assembly portion 54.

A method for detaching mechanically-connected components 40 in a wind turbine 10 is also disclosed as having the steps of; positioning a maintenance tool 50 below a hoist, the maintenance tool 50 having a nested configuration of a transport frame portion 52, an isolation assembly portion 54, and a lift assembly portion 56; then hoisting only the lift assembly portion 56 of the maintenance tool 50 into a nacelle 16 of a wind turbine 10; then connecting the lift assembly portion 56 to a power source in the nacelle 16; then extending at least two induction cables 60 from an induction generator 58 disposed on the lift assembly portion 56, and wrapping the at least two induction cables 60 proximate at least a portion of a component of the mechanically-connected components 40; then operating the induction generator 58 to pass alternating current through the at least two induction cables 60 and inductively heat the wrapped component such that thermal expansion creates a clearance between the mechanically-connected components 40; and then separating the mechanically-connected components 40.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for detaching mechanically-connected components of a drive train in a wind turbine, comprising;
   positioning a maintenance tool below a hoist, the maintenance tool comprising a nested configuration of a transport frame portion, an isolation assembly portion, and a lift assembly portion;
   hoisting only the lift assembly portion of the maintenance tool into a nacelle of a wind turbine;
   connecting the lift assembly portion to a power source in the nacelle;
   extending at least two induction cables from an induction generator disposed on the lift assembly portion, and wrapping the at least two induction cables proximate at least a portion of a component of the mechanically-connected components;
   operating the induction generator to pass alternating current through the at least two induction cables and inductively heat the wrapped component such that thermal expansion creates a clearance between the mechanically-connected components; and,
   separating the mechanically-connected components.

2. The method of claim 1, wherein the power source is positioned in a top box in a nacelle of the wind turbine.

3. The method of claim 1, wherein the induction generator operates in the range of about 0 volts AC to about 690 volts AC and a current of about 0 amps to about 100 amps.

4. The method of claim 1, wherein the component is heated in the range of about 100 degrees Fahrenheit to about 600 degrees Fahrenheit.

5. The method of claim 1, wherein the at least two induction cables comprise a fiberglass coating and are wrapped adjacent each in the same direction around the component.

6. The method of claim 1, wherein the component of the mechanically-connected components comprises a main rotor shaft, a shaft carrier, a bearing, a flexible coupling, a flange, and/or combinations thereof.

7. The method of claim 1, wherein the mechanically-connected components comprise an interference fit connection, a bolted connection, a screwed connection, and/or combinations thereof.

8. The method of claim 1, wherein the lift assembly portion further comprises a chiller that rejects heat into at least one of water, ethylene glycol, air, and/or combinations thereof.

9. A maintenance tool for detaching mechanically-connected components in a wind turbine, comprising;
   a transport frame portion;
   an isolation assembly portion at least partially removably encased within the transport frame portion; and,
   a lift assembly portion at least partially removably encased within the isolation assembly portion, the lift assembly portion comprising;
      an induction generator comprising at least two induction cables configured to wrap around at least one component of mechanically-connected components, wherein the at least two induction cables inductively couple with the at least one component so as to raise the temperature of the at least one component such that a clearance is created between the mechanically-connected components to separate the mechanical connection; and,
      a chiller configured for cooling the induction generator.

10. The maintenance tool of claim 9, wherein the isolation assembly portion further comprises at least one load isolator attached to the isolation assembly portion and disposed between the isolation assembly portion and the transport frame portion.

11. The maintenance tool of claim 10, wherein the at least one load isolator comprises at least one of helical wire cables, S-shaped cables, short bars, springs, and/or combinations thereof.

12. The maintenance tool of claim 9, wherein the induction generator further comprises a power connection extending from a power source in a top box in a nacelle of the wind turbine.

13. The maintenance tool of claim 9, wherein the induction generator operates in the range of about 0 volts AC to about 690 volts AC and a current of about 0 amps to about 100 amps.

14. The maintenance tool of claim 9, wherein the temperature of the at least one component is in the range of about 100 degrees Fahrenheit to about 600 degrees Fahrenheit.

15. The maintenance tool of claim 9, wherein the at least two induction cables comprise a fiberglass coating and are wrapped adjacent each other in the same direction around the component.

16. The maintenance tool of claim 9, wherein the at least one component of the mechanically-connected components comprises a main rotor shaft, a shaft carrier, a bearing, a flexible coupling, a flange and/or combinations thereof.

17. The maintenance tool of claim 9, wherein the mechanical connection comprises an interference fit connection, a bolted connection, a screwed connection, and/or combinations thereof.

18. The maintenance tool of claim 9, wherein the chiller rejects heat into at least one of water, ethylene glycol, air, and/or combinations thereof.

19. A wind turbine, comprising;
   a tower;
   a nacelle mounted atop the tower;
   a drive train positioned in the nacelle, the drive train comprising a main rotor shaft extending between a hub and an electric generator; and,
   a maintenance tool, comprising;
      a transport frame portion;
      an isolation assembly portion at least partially removably encased within the transport frame portion; and,
      a lift assembly portion at least partially removably encased within the isolation assembly portion, the lift assembly portion comprising;
         an induction generator comprising at least two induction cables configured to wrap around at least one component of the mechanically-connected components, wherein the at least two induction cables inductively couple with the at least one component so as to raise the temperature of the at least one component such that a clearance is created between the mechanically-connected components to separate a mechanical connection; and,
         a chiller configured for cooling the induction generator.

20. The wind turbine of claim 19, wherein the induction generator further comprises a power connection extending from a power source in a top box in the nacelle of the wind turbine operating in the range of about 0 volts AC to about 690 volts AC and a current of about 0 amps to about 100 amps.

* * * * *